3,264,271
HEAT-CURABLE MIXTURES OF EPOXY DERIVATIVES AND POLYCARBOXYLIC ACID ANHYDRIDES

Daniel Porret, Basel, Otto Ernst, Pfeffingen, Basel-Land, Erwin Nikles, Allschwil, and Fritz Kugler, Muttenz, Switzerland, assignors to Ciba Limited, Basel, Switzerland, a company of Switzerland
No Drawing. Filed Mar. 7, 1962, Ser. No. 177,993
Claims priority, application Switzerland, Mar. 27, 1961, 3,617/61; Apr. 12, 1961, 4,306/61
5 Claims. (Cl. 260—78.4)

It is known that the thermocuring of polyepoxy compounds, for example polyglycidyl ethers of polyphenols such as bis(para-hydroxyphenyl)dimethylmethane (bisphenol A) with polycarboxylic acid anhydrides such as phthalic anhydride gives rise to infusible and insoluble resins which have achieved considerable importance, for example, as insulating compounds in the electrical industry. Said curing is accompanied by a linear shrinkage which is made up of the actual curing or reaction shrinkage and of the dilatation shrinkage which sets in on cooling to room temperature. More especially, when large castings are concerned and when metal parts such as coils, condensers or transisor components are coated or potted, this shrinkage results in undesirable mechanical stresses whch may ultimately produce fissuring.

It is another shortcoming of the known mixtures of epoxy resins cured with polycarboxylic acid anhydrides that they have a so-called loss factor (tg δ) at high temperatures which is rather too high for certain electrotechnical uses.

Most surprisingly it has now been found that when a mixture of 3:4-epoxy-tetrahydro-dicyclopentadienol-8 (or 9)-glycidyl ether and 3:4-epoxy-tetrahydro-dicyclopentadienol-8 (or 9) or a glycol monoether or polyglycol monoether thereof is cured at an elevated temperature with a polycarboxylic acid anhydride, substantially no curing shrinkage at all occurs. Furthermore, the linear coefficient of expansion of the cured resin is very small and as a result the dilatation shrinkage on cooling is relatively low compared with that of the known cured epoxy resins. It has further been observed surprisingly that the new cured resin compositions have at high temperatures a loss factor tg δ considerably lower than that of the previously known cured epoxy resin compositions so that they can be used with special advantage as insulating materials in all sectors of the electrical industry where a high loss factor is disadvantageous.

The curable mixtures of 3:4-epoxy-tetrahydro-dicyclpentadienol-8 (or 9) glycidyl ethers and 3:4-epoxy-tetrahydro-dicyclopentadienol-8 (or 9) or a glycol monoether or polyglycol monoether thereof are at room temperature liquids of low viscosity which, when a polycarboxylic acid anhydride which is liquid at room temperature such, for example, as hexahydrophthalic anhydride is used as curing agent, offers special advantages in the processing, for example, in the form of casting or impregnating resin. While it is known that the viscosity of epoxy resins that are liquid at room temperature, such, for example, as the diglycidyl ether of bisphenol A, containing 5.0 to 5.3 epoxide equivalents can be reduced by adding a monoepoxide such as cresyl glycide, such additives impair as a rule the mechanical properties and more especially the shape retention of the product on heating. On the ohter hand, it is surprising to observe that the addition of 3:4-epoxy-tetrahydro-dicyclopentadienol-8 (or 9) to 3:4-epoxy-tetrahydro-dicyclopentadienol-8 (or 9) glycidyl ether produces no such impairment of the mechanical properties and even increases the shape retention of the cured resin on heating.

Accordingly, the present invention provides thermocurable mixtures containing (1) A diepoxide of the formula (I) 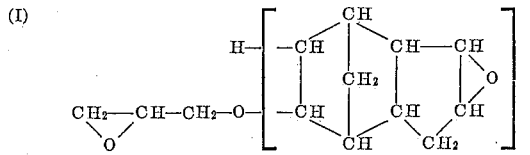

(2) A monoepoxide of the formula

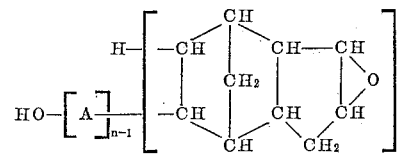

in which A represents an alkylene radical which may be interrupted by oxygen atoms, and n=1 or 2, and (3) At least one dicarboxylic or polycarboxylic anhydride.

The invention further provides a process for the manufacture of cured resins, wherein a mixture consisting of a diepoxide of the formula

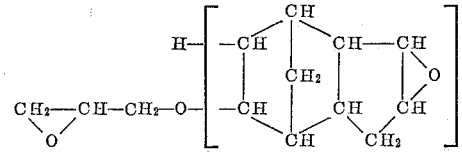

and a monoepoxide of the formula

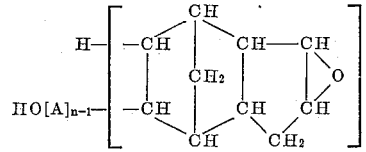

where A represents an alkylene radical which may be interrupted by oxygen atoms, and n=1 or 2—is reacted with at least one dicarboxylic or polycarboxylic anhydride at an elevated temperature.

The monoepoxides of the Formula II are readily accessible when in a first reaction stage water or a glycol or polyglycol such as ethylene glycol, propylene glycol, butanediol-1:4, pentanediol, hexanediol-1:6, diethylene glycol, triethylene glycol, a polyethylene glycol or polypropylene glycol, is added on to dicyclopentadiene. In a subsequent stage the resulting adduct is treated with an epoxidizing agent such, for example, as an organic peracid.

The diepoxide of the Formula I and the monoepoxide of the Formula II are preferably used at a ratio varying from 90:10 to 40:60 parts by weight. Furthermore it is of advantage to use in the curable mixture 0.5–1.1 gram equivalents of anhydride groups per gram equivalent of epoxide groups.

As dicarboxylic and polycarboxylic anhydrides to be used as curing agents in the mixtures of the invention there may be mentioned:

The anhydrides of the following acids: maleic, succinic, allylsuccinic, dodecenylsuccinic, adipic, phthalic, tetrahydrophthalic, hexahydrophthalic, hexachloro-endomethylene-tetrahydrophthalic, endomethylene-tetrahydrophthalic, methyl-endomethylene-tetrahydrophthalic, pyromellitic or mixtures of the aforementioned anhydrides. If desired, an accelerator may be used concomitantly such as a tertiary amine, for example tris(dimethylaminomethyl)phenol or strong Lewis bases, for example alkali metal alcoholates, also polyhydroxyl compounds such as hexanetriol or glycerol.

The curable mixtures of the invention further contain with advantage a share of a diepoxide (I) and monoepoxide (II) as defined above whose epoxide groups, however, are wholly or partially hydrolyzed to hydroxyl groups.

It is further possible to incorporate in the curable mixtures of the invention fillers, plasticisers, coloring matter or the like at any stage prior to the curing. Suitable extenders and fillers are, for example, asphalt, bitumen, glass fibers, mica, quartz meal, cellulose, kaolin, finely dispersed silicic acid (Aerosil) or metal powders.

The mixtures of the diepoxide (I), the monoepoxide (II) and the polycarboxylic acid anhydride as curing agent may be used without or with fillers, if desired, in the form of solutions or emulsions, as textile assistants, laminating resins, paints, lacquers, dipping resins, casting resins, coating compositions, pore fillers and putties, adhesives, moulding compositions or the like and also for the manufacture of such products. The new resins are particularly suitable for use as insulating compounds in the electrical industry, more especially in high-frequency applications.

Parts and percentages in the following Examples are by weight and the relationship of part by weight to part by volume is the same as that of the kilogram to the liter.

The curable mixtures according to the invention, used in the Examples, were prepared with the use of the epoxidized products A, B, C and D described below:

PRODUCT A. — 3:4-EPOXY-TETRAHYDRODICYCLOPENTADIENOL-8 (or 9)-GLYCIDYL ETHER (a) *Condensation of epichlorohydrin with 8-hydroxy-dihydro-dicyclopentadiene.*—300 parts of 8-hydroxy-dihydro-dicyclopentadiene are heated to 75° C., 2 parts of boron trifluoride etherate of 40% strength are added, whereupon in the course of 20 minutes 203 parts of epichlorohydrin are added dropwise. The reaction sets in spontaneously with considerable evolution of heat and the reaction temperature is maintained by cooling at 80 to 85° C. When all epichlorohydrin has been dropped in, the evolution of heat ceases and the batch is stirred with heating for another 20 minutes at 80° C. At this stage free epichlorohydrin can no longer be identified in the reaction mixture. Yield: 505 parts of a dark, viscous liquid consisting predominantly of the compound of the formula

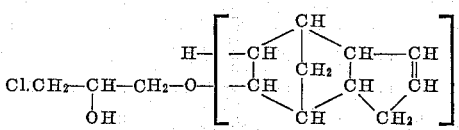

When instead of boron trifluoride etherate an equal amount of tin tetrachloride is used as catalyst, all other reaction conditions being identical, the same product is obtained.

(b) *Epoxidation of the chlorohydrin.*—503 parts of the chlorohydrin described above are mixed with 1360 parts by volume of benzene and 23 parts of sodium acetate. While stirring the mixture thoroughly and cooling it moderately, 464 parts of a solution of 36.1% strength of peracetic acid in acetic acid are added dropwise within 30 minutes, while maintaining the temperature at 33 to 35° C. One hour after introduction of the peracetic acid the evolution of heat ceases and the temperature begins to drop. After another 45 minutes the reaction mixture is cooled and a sample thereof is tested, whereupon it is found that at this stage 98% of the theoretical amount of peracetic acid has been consumed. The aqueous phase is then separated, and the benzene layer is washed with 3 x 450 parts by volume of water and then, while at the same time neutralizing the residual acetic acid, once with a solution of 35 parts of sodium hydroxide solution of 30% strength in 200 cc. of water, and finally with 250 parts by volume of water. The benzene and any residual water are then evaporated under a partial vacuum, and finally the residuum of volatile constituents is removed at an internal temperature of up to 80° C. under a vacuum of 0.2 mm. Hg.

In this manner there are obtained 485 parts of epoxidized chlorohydrin of the formula

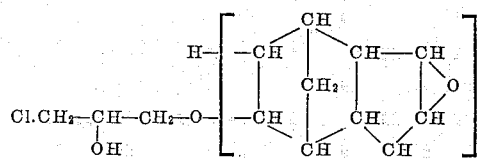

in the form of a yellow liquid containing 3.38 epoxide equivalents per kilogram, corresponding to 87.5% of the theoretical content.

(c) *Dehydrochlorination of the epoxidized chlorohydrin.*—A mixture of 475 parts of the epoxidized chlorohydrin described under (b) and 524 parts of sodium hydroxide solution of 30.2% strength is vigorously stirred for 90 minutes at 55° C. 1000 parts by volume of benzene are then added, the batch is cooled, the precipitated sodium chloride is suctioned off and the aqueous phase is separated. The benzene layer is freed under a partial vacuum from the solvent and then under 0.2 mm. Hg. pressure at an internal temperature of 105° C. from the last remnants of volatile constituents. Yield: 405 parts of the epoxidized glycidyl ether (Product A) of the formula

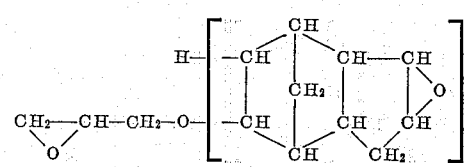

in the form of a dark-brown liquid containing 7.3 epoxide equivalents per kg., corresponding to 82.5% of the theoretical content. The product no longer contains any hydrolyzable chlorine.

PRODUCT B.—3:4-EPOXY-TETRAHYDRO-DICYCLOPENTADIENOL-8 (OR 9)

300 parts of dihydro-dicyclopentadienol-8 (or 9) are mixed with 1000 parts by volume of benzene and 20 parts of anhydrous sodium acetate. While stirring and cooling the mixture, 420 parts of peracetic acid of 44.6% strength are added portionwise within about one hour at 30° C. The mixture is allowed to react on for about one hour at 30° C., and then cooled. The solution of the epoxide is washed with water and 2 N-sodium carbonate solution until it is free from acid, dried over anhydrous sodium sulfate and evaporated. Distillation of the residue at 119° C. under 0.01 mm. Hg. pressure furnishes pure, colorless 3:4-epoxy-tetrahydro-dicyclopentadienol-8 (or 9) of the formula

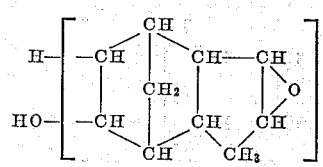

Titration with hydrogen bromide in glacial acetic acid reveals that the product contains 5.47 epoxide equivalents per kg.

*Analysis.* — $C_{10}H_{14}O_2$.  Calculated: O, 19.25%. Found: O, 19.48%.

PRODUCT C 3.43 parts of dihydro-dicyclopentadienol-8 (or 9)-glycidyl ether and 2.22 parts of dihydro-dicyclopentadienol-8 (or 9) are dissolved in 18 parts of benzene in an enamelled vessel. 0.35 part of anhydrous sodium acetate is added to the mixture which is then heated to 35° C. In the course of one hour 6.4 parts of peracetic acid of 42% strength are then dropped in with vigorous stirring. The mixture is stirred for another 6 hours at 35° C. The aqueous layer is then separated and the benzene solution is washed with 2 x 6.5 parts of water. The solution is then washed with 3 parts of water and at the same time neutralized with 1.1 parts of sodium hydroxide solution of 30 % strength, after which the solution is again washed with 6.5 parts of water and the benzene is then distilled off. At the beginning of this distillation a small amount of water separates. Finally, the last traces of volatile substances are removed at 110° C. under 15 mm. Hg pressure, to leave 4.25 parts of a clear product (Product C) which contains 6.6 epoxide equivalents per kg. and consists of 3:4-epoxy-tetrahydro-dicyclopentadienol-8 (or 9)-glycidyl ether and 3:4-epoxy-tetrahydro-dicyclopentadienol-8 (or 9).

PRODUCT D 486 parts of 8- (or 9)-(β-hydroxyethoxy)-dihydro-exo-dicyclopentadiene (prepared in known manner from dicyclopentadiene and ethylene glycol) are mixed with 1514 parts of ethyl acetate, and in the course of 1½ hours 380 parts of aqueous peracetic acid of 60% strength are stirred in portionwise, while cooling to maintain the temperature at 40° C. When the mixture has reacted for another 2½ hours at 40° C., 94% of the theoretical amount of peracetic acid has been consumed. The solution is diluted with 2400 parts by volume of ethylbenzene and evaporated under a water-jet vacuum. The last remnants of solvent are removed at 100° C. under a high vacuum. Yield: 523 parts of residue consisting predominantly of 3:4-epoxy-8 (or 9)-(β-hydroxyethoxy)-tetrahydro-exo-dicyclopentadiene of the formula

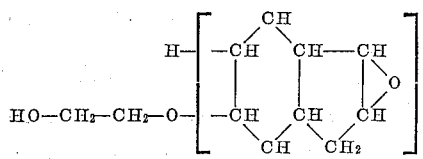

The product contains 4.18 epoxide equivalents per kg.; it is distilled under a high vacuum. Boiling point: 106–107° C. under 0.005 mm. Hg pressure. The distillate contains 4.23 epoxide equivalents per kg.

Example 1

In a first test 188 parts of phthalic anhydride are dissolved at about 120° C. in 232 parts of 3:4-epoxy-tetrahydro-dicyclopentadienol-8 (or 9)-glycidyl ether (Product A), containing 7.3 epoxide equivalent per kg.; in a second test 210 parts of phthalic anhydride are dissolved at about 120° C. in 300 parts of an epoxy resin mixture consisting of 180 parts of Product A and 120 parts of 3:4-epoxy-tetrahydro-dicyclopentadienol-8 (or 9) (Product B; containing 5.47 epoxide equivalents per kg.) and in a third test 195 parts of phthalic anhydride are dissolved at about 120° C. in 300 parts of a polyglycidyl ether resin which is liquid at room temperature (Product D; viscosity: 9000 centipoises at 25° C.; containing 5.3 epoxide equivalents per kg.; prepared by reacting epichlorohydrin with bis-(4-hydroxyphenyl)-dimethylmethane in the presence of alkali).

A portion of each of the casting resin mixtures so prepared is cast at about 120° C. in aluminum moulds (150 x 150 x 2 mm.) and each casting is cured for 24 hours at 140° C. When the resulting plates of casting resin are tested for their electrical properties, the values shown in the following Table 1 are obtained:

TABLE 1

| Test Specimen | 1 | 2 | 3 |
| --- | --- | --- | --- |
| Loss factor tg δ measured at 160° C. (VDE 0303, part 4) | 0.025 | 0.016 | 0.085 |
| Dielectric constant ε measured at 160° C. (VDE 0303, part 4) | 4.0 | 4.0 | 4.3 |
| Specific resistance measured on Schering bridge 1,000 v., 50 cycles (VDE 0303, Part 3) in Ohm cm | 5×10¹³ | 1.2×10¹⁴ | 1.1×10¹³ |

As will be realized from the above values, the casting resin mixture of the invention (test specimen 2) is particularly suitable for use in the electrical industry, for example as insulating compound, or in the manufacture of apparatus.

A further portion of each of specimens 1, 2 and 3 is used for determining the shrinkage loss. For this purpose mixtures of epoxy resin and curing agent are cast at 140° C. in thick-walled horizontal aluminum moulds (230 x 10 x 25 mm.) and cured at a constant temperature of 140° C.

The amount of shrinkage occurring from the moment when the casting detaches itself from the mould (gelling) until it is completely cured is defined as the linear reaction shrinkage. Linear reaction shrinkage is the linear reaction shrinkage referred to the length of the mould at the curing temperature. When the curing of the casting is complete (after about 24 hours) the structure is cooled to room temperature and this is accompanied by further shrinkage, the linear dilatation. From the latter the mean linear coefficient of expansion can be computed according to the formula $$\beta = \beta_F + \frac{\Delta}{l_{20} \cdot \Delta t}$$

where $\beta_F$ = coefficient of expansion of the mould
$\Delta$ = linear dilatation
$l_{20}$ = length of cured casting at 20° C.
$\Delta t$ = difference between curing temperature and room temperature.

The linear shrinkage is defined as the difference in percent between the length of the cured casting and the length of the form, both measured at 20° C. This value represents the contraction of the casting, calculated from the moment of gelling to the cooling of the cured casting at 20° C. and the contraction of the mould due to this cooling, referred to the length of the mould at 20° C.

The test results are summarized in the following

TABLE 2

| Test specimen | 1 | 2 | 3 |
| --- | --- | --- | --- |
| Linear reaction shrinkage in percent at a reaction temperature of 140° C | 0.7 | 0.1 | 1.3 |
| Mean linear coefficient of expansion in cm./cm. x ° C. on cooling from 140° C. to 20° C | 70×10⁻⁶ | 64×10⁻⁶ | 79×10⁻⁶ |
| Linear shrinkage in percent of the specimens cured at 140° C | 1.25 | 0.5 | 2 |

From the above comparison of values it will be realized that the casting resin mixture of the invention, is particularly suitable as tool resin, for the manufacture of large castings and for coating, for example metal parts such as coils (impregnating), rods (manufacture of apparatus) or other materials such as paper, glass fibers (laminates) and the like.

Example 2

A first test is carried out with the polyglycidyl ether resin (Product D), which is liquid at room temperature, as used in Example 1 and a second test with an epoxy resin mixture consisting of 50 parts of the diepoxidized compound (Product A) used in Example 1 and 50 parts of the monoepoxidized compound (Product B) used in Example 1.

In each case the curing agent used is 0.85 equivalent of phthalic anhydride per equivalent of epoxide groups, fused in at 120° to 125° C.

Each specimen of the casting resin mixtures is cast at about 120° C. in an aluminum mould (40 x 10 x 140 mm.) and cured at 140° C. The advantages of specimen 2 according to the invention over the known specimen 1 (lower viscosity of the casting resin mixture and better mechanical properties of the cured castings) are summarized in the following

TABLE 3

| Specimen | Viscosity of resin or resin mixture at 25° C. in cp. | Impact bending strength, cmkg./cm.$^2$ | Thermostability according to Martens DIN in ° C. |
|---|---|---|---|
| 1 | 9,000 | 10.3 | 111 |
| 2 | 500 | 10.8 | 162 |

*Example 3*

0.75 equivalent of phthalic anhydride per equivalent of epoxide groups is fused in each case at 120 to 125° C. in 100 parts of an epoxy resin mixture consisting of 80 parts (Test 1), 60 parts (Test 2) and 40 parts (Test 3) of Product A respectively 20 parts, 40 parts and 60 parts of the monoepoxidized compound (Product B) used in Example 1.

The resulting casting resin mixtures are cast at about 120° C. in aluminum moulds (40 x 10 x 140 mm.) and then cured for 24 hours at 140° C. The bending strength and thermostability according to Martens DIN of the cured castings are shown in the following

TABLE 4

| Test | 1 | 2 | 3 |
|---|---|---|---|
| Product A | 80 | 60 | 40 |
| Product B | 20 | 40 | 60 |
| Bending strength in kg./mm.$^2$ | 6.7 | 10.2 | 8.4 |
| Thermostability according to Martens DIN in ° C. | 155 | 157 | 153 |

A significant feature of the above products is their high bending strength combined with a very high thermostability according to Martens DIN.

A portion of specimen 2 is used for cementing tests in which degreased and ground strips of aluminum marketed under the trade name "Anticorodal B" (170 x 25 x 1.5 mm.; overlap 10 mm.) are cemented together and cured for 24 hours at 140° C. After curing, the strips so cemented together display a tensile shear strength of 1.60 kg./mm.$^2$.

*Example 4*

Phthalic anhydride as curing agent is fused at 120 to 130° C. into a mixture of 60 parts of Product A (see Example 1) and 40 parts of Product B (see Example 1). In each case the following equivalents of anhydride groups per equivalent of epoxide groups are used: Test 1—0.65, Test 2—0.75, Test 3—0.85 and Test 4—1.0. In Test 4 there are additionally incorporated 1.75 parts of a sodium alcoholate prepared by dissolving 0.82 part of sodium metal in 100 parts of 2:4-dihydroxy-2-hydroxymethylpentane at about 120° C.

Each casting resin mixture prepared as described above is cast at about 120° C. in an aluminum mould (40 x 10 x 140 mm.) and cured for 24 hours at 140° C. The thermostability according to Martens DIN of the cured castings is shown in the following

TABLE 5

| Test specimen | Equivalent of phthalic anhydride per equivalent of epoxide groups | Thermostability according to Martens DIN in ° C. |
|---|---|---|
| 1 | 0.65 | 151 |
| 2 | 0.75 | 157 |
| 3 | 0.85 | 158 |
| 4 | 1.0 | 153 |

Similar results are obtained when the mixture of epoxy resin and curing agent is prepared by dissolving the phthalic anhydride at about 120° C. in Product A (diepoxide) and then incorporating Product B (monoepoxide), or when the phthalic anhydride is first dissolved at about 120° C. in Product B (monoepoxide) and Product A (diepoxide) is then added, or when all constituents are mixed at room temperature and then turned into a homogeneous solution at an elevated temperature.

*Example 5*

The procedure is as described in Example 2, except that the curing agent used is a mixture of polycarboxylic acid anhydrides consisting of 75 parts of tetrahydrophthalic anhydride and 25 parts of phthalic anhydride.

The cured casting resin mixture according to the invention consisting of equal parts of Product A and Product B has in the cured state a thermostability according to Martens DIN of 121° C. compared with 89° C. of the known, cured casting resin mixture containing Product D.

*Example 6*

90 parts of methyl-endomethylene-tetrahydrophthalic anhydride (0.75 equivalent of anhydride groups per equivalent of epoxide groups) are dissolved at room temperature in 100 parts of an epoxy resin mixture consisting of 70 parts of a diepoxide compound (prepared as described for Product A containing 7.16 epoxide equivalents per kg.) and 30 parts of Product B (see Example 1).

A portion of the above resin+curing agent mixture is cast at room temperature in aluminum moulds (40 x 10

A portion of the above resin+curing agent mixture is cast at room temperature in aluminum moulds (40 x 10 x 140 mm.) and then cured for 24 hours at 200° C. Even after these extreme curing conditions the cured casting resin specimens display a bending strength of 9.1 kg./mm.$^2$, an impact bending strength of 9.2 cm. kg./cm.$^2$ and a thermostability according to Martens DIN of 150° C. and they are very clear, which fact suggests that this combination has a very good sustained thermostability at extremely high temperatures.

A further portion of the above epoxy resin+curing agent mixture is cast on glass plates in a layer about 0.1 mm. thick and cured for 24 hours at 160° C. The resulting, perfect, hard films adhere excellently to the glass and prove resistant to attacks of 5 N-sodium hydroxide solution, 5 N-sulfuric acid, water, acetone and chlorobenzene sustained for one hour at room temperature.

*Example 7*

73 parts of phthalic anhydride (0.75 equivalent of anhydride groups per equivalent of epoxide groups) are fused at 120 to 125° C. in 100 parts of Product C [mixture of 3:4-epoxy-tetrahydro-dicyclopentadienol-8 (or 9)-glycidyl ether and 3:4-epoxy-tetrahydro-dicyclopentadienol-8 (or 9)] containing 6.6 equivalents of epoxide groups per kg. The resulting casting resin mixture is cast in aluminum moulds and cured as described in Example 3.

The cured casting has a bending strength of 9.4 kg./mm.$^2$, an impact bending strength of 7.9 cm. kg./cm.$^2$ and a thormostability according to Martens DIN of 159° C.

*Example 8*

Test 1 is performed with a diepoxide compound prepared as described for Product A, containing 6.8 epoxide equivalents per kg., and Test 2 with a mixture consisting of 50 parts by weight of the above diepoxide compound prepared as described for Product A and 50 parts by weight of Product D [8 (or 9)-(β-hydroxyethoxy)-3,4-epoxy-tetrahydro-dicyclopentadiene] containing 4.2 epoxide equivalents per kg.

In each case a solution of 0.75 equivalent of phthalic anhydride per equivalent of epoxide groups is used as curing agent. Each casting resin mixture so prepared is cast as described in Example 2 and cured for 24 hours at 140° C.

The properties of the cured castings are shown in the following table:

| Test Specimen | Bending strength, kg./mm.$^2$ | Impact bending strength, cmkg./cm.$^2$ |
|---|---|---|
| 1 | 3.5 | 2.1 |
| 2 | 9.2 | 6.9 |

What is claimed is:
1. Thermocurable mixtures comprising
(a) a diepoxide of the formula

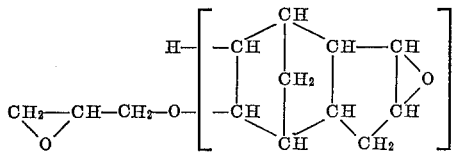

(2) a monoepoxide of the formula

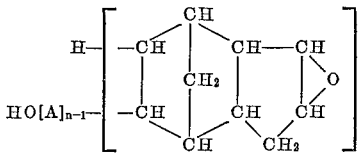

where A represents the radical which is obtained by removing the terminal hydroxyl groups from a member selected from the class consisting of aliphatic saturated dialcohols and polyalkylene glycols, and $n$ is an integer of at least 1 and at the most 2 and
(3) a polycarboxylic acid anhydride.

2. Mixtures as claimed in claim 1, wherein the ratio of the diepoxide of the Formula I to the monoepoxide of the Formula II ranges from 90:10 to 40:60 parts by weight.

3. Mixtures as claimed in claim 1, containing for every gram equivalent epoxide groups 0.5 to 1.1 grams equivalents of anhydride groups.

4. Mixtures as claimed in claim 1, containing methylendomethylene-tetrahydrophthalic anhydride as the polycarboxylic acid anhydride.

5. Mixtures as claimed in claim 1, containing phthalic anhydride as the polycarboxylic acid anhydride.

References Cited by the Examiner

UNITED STATES PATENTS 3,042,686  7/1962  O'Brien et al. _____ 260—348

FOREIGN PATENTS 1,265,059  8/1960  France.

OTHER REFERENCES

Jour. of the American Chem. Soc., vol. 82, p. 5545–5574.

MURRAY TILLMAN, *Primary Examiner.*

LEON J. BERCOVITZ, *Examiner.*

E. J. TROJNAR, P. LIEBERMAN, *Assistant Examiners.*